Inventor:
Emilio Santuari

April 1, 1924.  1,488,556

E. SANTUARI

ARRANGEMENT FOR THE RECOVERY OF ENERGY IN ELECTRICAL RAILWAY
SYSTEMS EMPLOYING SERIES CONNECTED DIRECT CURRENT MOTORS

Filed Feb. 9, 1921  3 Sheets-Sheet 3

Inventor:
Emilio Santuari
By
Attorney.

Patented Apr. 1, 1924.

1,488,556

UNITED STATES PATENT OFFICE.

EMILIO SANTUARI, OF MILAN, ITALY.

ARRANGEMENT FOR THE RECOVERY OF ENERGY IN ELECTRICAL RAILWAY SYSTEMS EMPLOYING SERIES-CONNECTED DIRECT-CURRENT MOTORS.

Application filed February 9, 1921. Serial No. 443,701.

*To all whom it may concern:*

Be it known that I, EMILIO SANTUARI, subject of the King of Italy, residing at Milan, Kingdom of Italy, have invented certain new and useful Improvements in Arrangements for the Recovery of Energy in Electrical Railway Systems Employing Series-Connected Direct-Current Motors, of which the following is a specification.

An important consideration in the selection of the kind of current to be employed in electrical railway systems having steep grades is the capacity of the electrical motor equipment for recovering the greatest possible part of the energy generated by trains running down hill. The motors in such a case act as generators and return current to the supply circuit. The recovery of energy through the operation of an equipment of series-connected direct-current motors has been introduced hitherto in only a few isolated cases, on account of the often complicated connections which are necessary in order to enable the motors to act as constantly working generators during the recovery period. The objections met with in the systems hitherto employed for recovering energy by means of series-connected direct-current motors are of various kinds; among them may be mentioned:

The necessity of providing the traction motors with special shunt-connected generator windings to be used during the recovery period, or alternatively the necessity of independently supplying the series field windings of the motors from a separate source of low-voltage energy, which source of energy may consist of an excitation machine, such as a motor-generator set, or an accumulator battery.

An excitation machine involves a complicated system in order to make it possible to regulate the excitation voltage independently of the speed of the train.

When an accumulator battery is used for supplying the field windings, the dead weight of the locomotive or motor coach is considerably increased in view of the considerable capacity for which the battery has to be built.

All these measures, which, as stated above, are necessary in order that the traction motors may act as generators, necessitate on the one hand a considerable complexity in the equipment of the cars or coaches and in addition make considerable claims upon the limited space available in the locomotives or the motor cars. Finally, these arrangements considerably increase the weight and the cost of the equipment.

If the recovery of energy through the agency of motor cars has never yet been effected, this is due principally to lack of space. In direct-current high-tension railway systems, interruptions in operation have often been experienced, which interruptions were found to be due to faulty operation of the driving motors for the excitation generators, these motors being supplied directly from the mains with high-tension current. Serious damage to these motors necessarily causes trouble with the excitation machines and leads to a short circuit in the motors, which might prove very dangerous both for the motors and for the whole equipment. On the other hand, the system of recovering energy by means of excitation machines driven mechanically by the locomotive or motor car axles is very sensitive in operation, necessitates onerous supervision and attention and gives rise to constant expense in consequence of the necessity of providing a complicated automatic regulating device which allows of regulating the voltage of the excitation generator independently of the speed of the train. If the use of a special separate source of low-voltage energy for supplying the field windings of the motors during the recovery period is to be avoided, it is necessary, according to the systems hitherto employed, to provide a large number of motors upon a single locomotive or motor car; some of these are utilized, during the recovery period, to excite the remaining motors, which generate current to be returned to the mains. Although this method can be employed where excessively heavy locomotives are used, as is the case, for example, on American railways, it is unsuitable for locomotives which are built for railways in many other countries, the weight of which is necessarily limited in order not to exceed the axle pressure that is permitted.

By means of the system which forms the subject of the present invention, the above-mentioned objections are obviated.

During regeneration periods, the motors work as shunt-excited generators and the current which supplies the field windings is furnished by the motors themselves.

The invention is based upon the following considerations.

1. The units of the motor equipment form a sort of Wheatstone bridge, the branches of which may consist of separate units or of a group of units connected together in certain ways.

2. The series field windings of the units, suitably connected together, are further connected to the junction-points of the bridge to which, in a Wheatstone bridge, the galvanometer is connected.

3. A disturbance of the symmetry of the whole system is produced in some suitable way. Under these conditions, there arises a difference in potential between the points of otherwise equal potential to which the excitation current circuit of the motors is connected, and this difference in voltage creates a current which flows through the excitation coils of all units in the desired direction.

The accompanying drawings illustrate diagrammatically the various embodiments of the invention, wherein—

Figure 1:
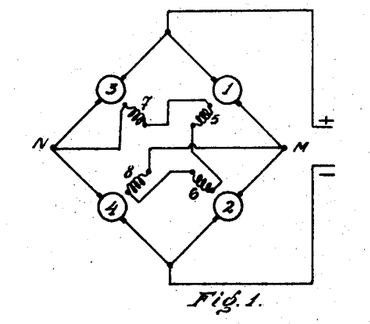
Figure 1 illustrates the fundamental wiring diagram of the Wheatstone bridge.

The reference numerals 1, 2, 3, 4, which illustrate by way of example a four-motor equipment, indicate the armature windings and 5, 6, 7, 8 indicate the field windings of the motors which, during normal travel, are connected in series with the proper armature windings. For the recovery of energy, the field windings are arranged in series one with another, and the terminals of the circuit thus formed are connected to the points N and M. If the group of units so connected is connected in the manner illustrated, to the main source of power, then, if the four motors are, as usual, alike, there will be a complete symmetrical circuit, since the points M and N must be of equal potential and no appreciable amount of current will flow through the excitation coils. The generated electromotive force of the units will, therefore, be practically nil. If, now, the symmetry of the bridge is disturbed by the employment of any suitable means, M and N will assume different potentials and this will create a difference in potential which will allow a current to flow through the excitation coils of the machines.

Figure 2:
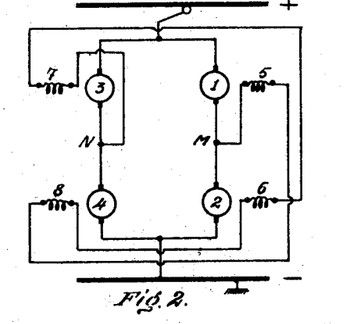
Fig. 2 illustrates the usual wiring diagram of a four-motor equipment.

If Fig. 1 is re-arranged to cause it to conform to the usual connection diagram of motor-coach equipment, the arrangement shown in Fig. 2 results. In this figure, the only change in connections is a slight alteration of the sequence of the excitation coils. This latter arrangement is adhered to in all the subsequent cases that are described.

The disturbance of the symmetry of the bridge may, as stated, be produced in various ways, and several methods are explained in detail below, by way of example, in connection with a four-motor equipment.

Figure 3:
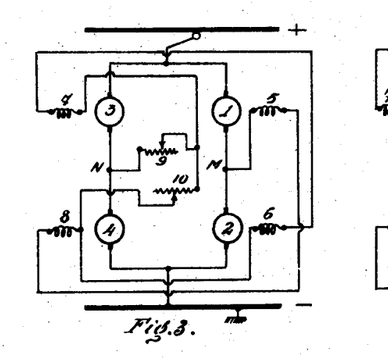
Fig. 3 illustrates a resistance unit for causing a disturbance of the symmetry of the bridge.

Fig. 3 shows the first method. The reference numerals 1 to 8 indicate as above the separate parts of the four main machines. 9 indicates a resistor of suitable capacity and capable of being regulated as desired, which resistor is placed in series with the excitation windings of the machines. 10 is a suitable resistor that is adapted to be suitably regulated and, if desired, provided with self-induction; this resistor is arranged in shunt to the field windings 7 and 6.

The drawing shows the connections which should be formed between the several windings and resistors during the period of recovery of energy and are to be obtained by means of special arrangements of control devices. Assuming that the four machines are, as usual, alike and that the resistor 10 is open-circuited, then, as already stated, the machines will not excite themselves and there will be practically a complete symmetrical circuit. If, however, the resistor 10 is inserted in circuit and set at a predetermined value, then the electromotive force produced in the armature windings 2 and 3 will assume a lower value than that in the armature windings 1 and 4 and the potential at point N will become higher than that at M. The excitation windings are, accordingly, then traversed by a current which, in consequence of the above-described connections, will excite the armature windings in the required direction. The excitation current produced during the recovery period should traverse the field windings of the machines in the same direction in which it traverses these windings during the normal running of the machines as series-connected motors. It will be seen that the excitation current produced in this manner is practically independent of the magnitude and direction of the main or regenerated current. The machines, connected in this manner, accordingly operate as shunt-excited machines and are, consequently, adapted to operate as generators returning current to the mains. In this embodiment of the invention, the symmetry of the bridge is disturbed by a suitable arrangement of a resistor in shunt to the field windings of some of the machines, that is to say, by weakening the field of the latter as compared with the other machines. The same object can be obtained in another way by weakening the field by reason of reducing the active turns of the excitation windings of some of the machines.

Figure 4:
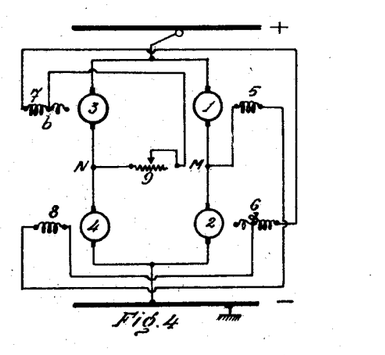
Fig. 4 illustrates the symmetry of the bridge disturbed by means of reducing the excitation windings of some of the machines.

Fig. 4 illustrates the principle underlying this method, in the case of the above-mentioned four-motor equipment. The parts indicated by the reference numerals 1 to 9 are the same as before except that the resistor 10 is omitted. The field windings indicated by 6 and 7, which belong to the machines with the armature 2 and 3, are provided at suitable intermediate points with attachment terminals $a$, $b$, which allow the active turns of these two excitation coils to be reduced. In this case, also, the excitation circuit of the machines is formed by connecting all four excitation coils in series relation, but, by the use of the attachment terminals $a$, $b$, only a part of each of the excitation coils 6, 7 is rendered active. With this method, also, the results may be obtained that the electromotive force produced in the armature windings 2 and 3 is of lower value than that in the armature windings 1 and 4 and the potential at N is higher than that at M. In this case, moreover, the sequence of the field windings in the excitation circuit may be chosen at will, while in the case illustrated in Fig. 3, it is fixed if only one resistor is to be used.

A third method of disturbing the symmetry of the bridge is afforded by the use of machines of different saturation characteristics. In this case, the machines do not need attachment terminals on the field windings and the use of a resistor is also superfluous.

Figure 5:
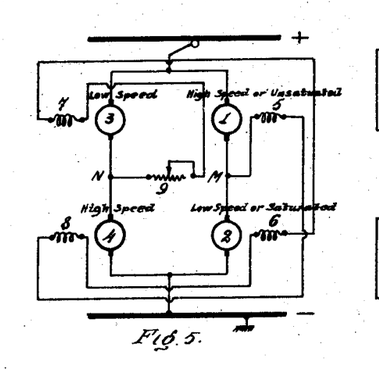
Fig. 5 illustrates the units disturbed by running the motors at different speeds.

Fig. 5 illustrates an example of this method. The two machines comprising the armature winding 2 and field winding 6, and the armature winding 3 and field winding 7, have different saturation values from those of the other machines, their saturation values being preferably higher. The circuit of the excitation coils is formed as before; with regard to the sequence of the several field windings the same selection is available as in the case of Fig. 4. The four machines may be excited in any suitable way in the desired direction and the E. M. F. in the armatures of the machines of higher saturation; that is, in the armatures 2 and 3, will be of lower value than the E. M. F. in the two other armatures, and, as before, the potential at N will be higher than that at M. Accordingly, a current will flow through the excitation coils in the desired direction and the machines will excite themselves as shunt-connected generators and will continue to operate as such.

Figure 6:
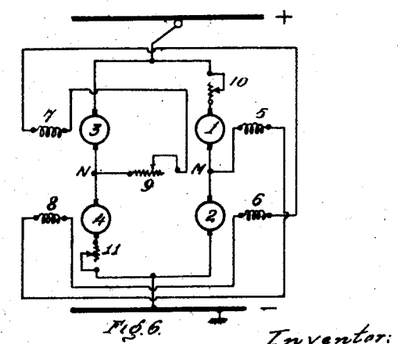
Fig. 6 illustrates another method of connecting resistance units in the circuits.

A further manner of disturbing the symmetry is illustrated diagrammatically in Fig. 6. In this case, four similar main-current machines are used, the armature and field windings of which are connected as in the foregoing case, with this difference, that, in the present case, the four machines have the same density of saturation. For obtaining the desired disturbance of symmetry, there are employed two adjustable, similar and suitable proportioned resistors 10 and 11, which are connected in circuit at a suitable point ahead of the armatures 1 and 4. When the resistors 10 and 11 are suitably adjusted, if the system so organized is connected with the mains, then the drop in potential of the current flowing through the armatures of the machines in the four branches of the bridge will not be equal but it will attain a higher value in those branches which have a higher resistance; in the present case, therefore, in the branches having the two resistors 10 and 11. The potential in this case will also be higher at point N than that at point M.

If the motor equipment is composed of four machines which, while otherwise alike, have a different armature resistance, and if these machines are connected as shown in Fig. 6, so that the two armatures which have the higher resistance take the place of elements 1 and 10 or of elements 4 and 11, then, in this case, the resistors 10 and 11 are superfluous and the same result is obtained without them.

A further method of disturbing the symmetry of the bridge is afforded by selecting different speeds for otherwise identical machines. Reference may be made to Fig. 5. The four machines are identical with one another. If, by any means, the speed of the armatures 1 and 4 is increased as compared with the speed of the others, then higher E. M. F.'s will be produced in the armatures 1 and 4 as compared with those in the armatures 2 and 3. Point N will, in this case, also have a higher potential than point M and the four machines will thereby be caused, exactly as before, to excite themselves in shunt.

Finally, the disturbance of the symmetry of the bridge can be attained by selecting unequal machines for the equipment. This case will be understood without any further explanation being necessary. A special case, however, is that in which machines with different numbers of turns in the armature windings are employed; that is, in other words, machines wound for different voltages, which is permissible where two or more machines are constantly connected in series. The machines are otherwise entirely similar. If, for example, in Fig. 5, the armatures 2 and 3 have a smaller number of turns than the armatures 1 and 4, then the E. M. F.'s of the armatures 2 and 3 will, at all times, be lower than those of the two other armatures.

It will be clearly understood that the disturbance in the symmetry of the bridge may be produced simultaneously by two or more of the methods previously explained.

The excitation current produced in the manner explained above, which current, as stated, is practically independent of the magnitude and direction of the main current, may be controlled in various ways. This method makes possible, also, a control of the load or speed of the machines. The following different methods of control will be considered.

In the first place, the desired control may be effected by varying the active resistance of the resistor 10, as indicated in Fig. 3. It will be clearly understood that, by suitably varying this resistance, the E. M. F. induced in the armature windings 2 and 3 and, consequently, also, the value of the voltages at points N and M may be varied. In like manner, the excitation current of the four machines may be brought to the desired magnitude and the load or speed of the machines may be regulated to the desired values.

A second method is afforded by varying the series resistor 9. If, in the arrangement illustrated in Fig. 3, it is assumed that the disturbance in the symmetry of the bridge is produced by a definite adjustment of the resistor 10, then the regulation of the series resistor 9 affords the possibility of varying at will the resistance of the whole excitation circuit and, since the potential difference between the points N and M is previously determined by the adjustment of the resistor 10 and is practically independent of the load of the machines, the excitation current may be regulated within desired limits and, consequently, the load and speed of the machines may be varied.

The possibility of regulating the excitation current and with it the load and speed of the machines by varying the series resistor 9 has been already considered in all the illustrated methods of disturbing the symmetry of the bridge and, accordingly, the resistor 9 has been included in Figs. 3 to 6.

In the case illustrated in Fig. 4, the excitation current may also be regulated by disposing different attachment terminals or taps on the excitation coils 6 and 7.

A further method of regulating the excitation current is by varying the resistors 10 and 11 which, in the system of Fig. 6, are connected in the armature circuits. This method will vary the potential difference between the points M and N, as well as the excitation current.

Finally, it may be mentioned that the provision of different speeds for the machines permits of regulating the excitation current, provided that there are at hand suitable means, such as variable speed transmission and the like, which allow of varying the speeds of some of the machines, with regard to the others, gradually or by stages.

It will be understood that two or more of the above-mentioned methods for varying the excitation current or for regulating the load and speed of the machines may be used simultaneously. The main or regenerative current machines, when connected according to the methods explained above, operate, in general, as machines excited in shunt, and their speed is practically independent of the load. The machines may, of course, operate either as motors or as generators. In many cases, and, particularly, in railway work, a purely shunt characteristic of the machines is undesirable because the operation of the machines is then relatively inflexible; so that they are exposed to heavy changes of load and even to short-circuits, which endanger the machines themselves and may throw an undesirable load upon the mains. It is, therefore, preferable to arrange the machines as compound machines. This result may be attained very simply by connecting a small part of the excitation winding constantly in circuit with the armature of the machines. This part of the winding then acts as a compound winding.

Figure 7:
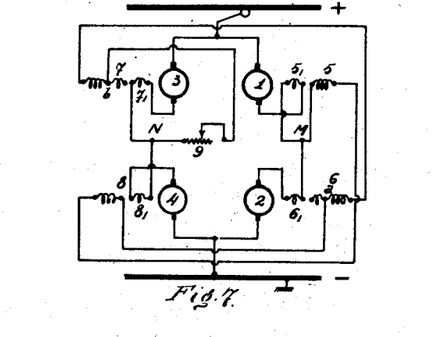
Fig. 7 illustrates the arrangement as in Fig. 4 applied to compound machine.

Such an arrangement as this, for the four-motor equipment illustrated in Fig. 4, is shown diagrammatically in Fig. 7. The reference characters 1 to 9 indicate the same parts as before but, in this case, the excitation coils 5, 6, 7 and 8 are each divided into two parts. One part, which is indicated respectively by 5', 6', 7' and 8' (corresponding to the respective excitation coils) is always connected to its proper armature winding and operates, in the arrangement illustrated, as a compound winding. When acting as motors, the machines take current from the mains, and the compound winding supplements the action of the part of the excitation coil that is connected in shunt, so that the excitation of the machines is strengthened when the motor current rises. In this way, the induced E. M. F. in the armature windings is increased and the speed is decreased so that the load is diminished. When, on the other hand, the machines are acting as generators and are returning current into the mains, the compound winding works in opposition to the part of the excitation coil that is connected in shunt and the excitation is, therefore, reduced when the regenerated current rises. Consequently, the E. M. F. induced in the armature windings is of lower value and the current returned into the mains will be reduced. The result of this action is an automatic reduction of the load of the machines.

The fundamental idea on which my invention is based may be utilized in many ways; the case which has been considered so far of a motor equipment consisting of four machines is only put forward by way of example and for the sake of simplicity. In explaining the invention by means of further systems, it appears to be desirable to simplify the connections illustrated hitherto and to unite them in a single diagram of connections. For the sake of simplicity all resistors and the parts of the excitation coils that act as compound windings will be omitted and the excitation circuit will be indicated quite diagrammatically. This is the case in Fig. 8, in which reference figures 1, 2, 3, 4, indicate as before the armature windings of the four machines, while the letter E indicates the excitation circuit, which may be formed in any suitable way.

Figure 9:
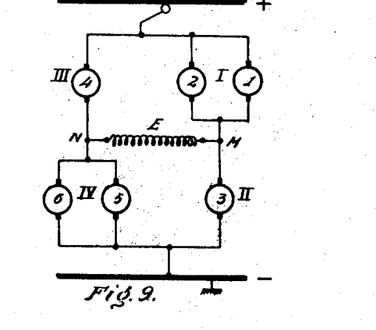
Figs. 9, 10, 11 and 12 illustrate the connections for a six-motor equipment.
Figure 10:
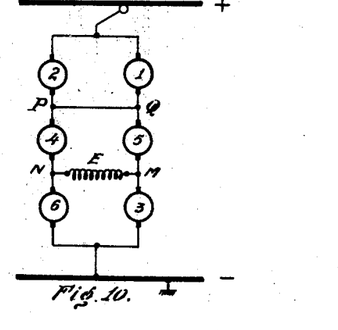
Figure 11:
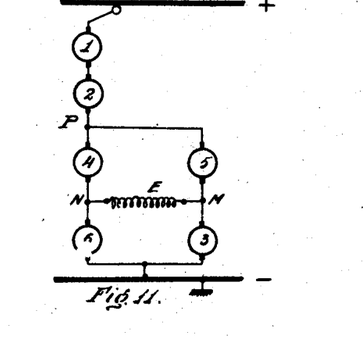

Some of the many cases which may occur are considered below. In a six-motor equipment, for example, the connections indicated in Figs. 9, 10, 11, 12 may be made. The reference characters 1, 2, 3, 4, 5, 6 indicate the armature windings and E the excitation circuit. M and N are again the opposite points of the bridge to which the excitation circuit is connected. In Figs. 10 and 11, it will be noted that the bridge embodies the armature windings 3, 4, 5 and 6 only. In Fig. 10, the points P and Q are short-circuited and in Fig. 11 the armature winding 5 is connected at point P with the armature windings 2 and 4.

Figure 12:
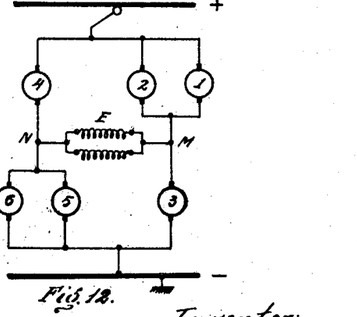

In all the examples that have been considered hitherto, the excitation coils of all the machines are connected in a single series circuit. Cases may, however, arise as indicated in Fig. 12, in which the excitation circuit is formed of two or more groups in parallel relation, each comprising a plurality of series-related excitation coils. Finally, the excitation circuit may be formed by suitable series connection of separate elements comprising excitation coils which vary among themselves in the number of parallel-connected branches.

Figure 13:
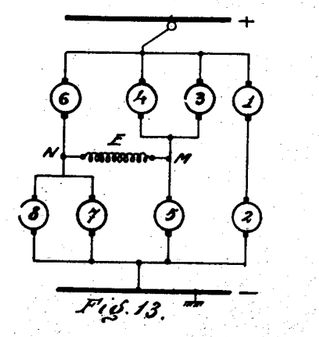
Fig. 13 illustrates the connections for an eight-motor equipment.

Connections are also possible as indicated in Fig. 13, in which only a portion of the machines are used for generating the excitation current. In this case, which illustrates one of the many possible arrangements of an eight-motor equipment, the reference characters 1 to 8 indicate the armature windings of the machines. E indicates the excitation circuit, which may be formed in any suitable way from the whole of the excitation coils, and M and N indicate the points at which this circuit is connected. As may be seen, the armature windings 1 and 2 do not assist in creating the excitation current.

In equipments with more than four motors, the number of possible connections considerably increases, but it is not necessary to consider these more closely. In general, two machines which lie in opposite branches of the bridge and are accordingly excited equally and loaded equally, may be replaced by a single machine, the armature of which has two independent windings that lead to two commutators. For disturbing the symmetry of the bridge, the regulation of the excitation current, the production of the compound operation and the possibility of various connections with more than two double-commutator machines, the same applies as has been said already with regard to machines having single commutator.

Figure 14:
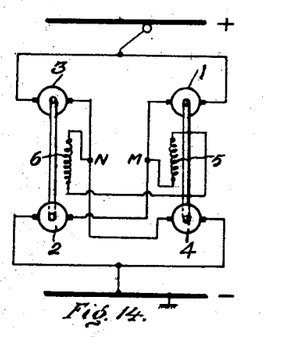
Figs. 14 and 15 illustrate the connections for changing from series to shunt operation of the machines.

By way of example, there is illustrated in Fig. 14 the arrangement previously shown in Fig. 2 and also containing the last-named modification. Here the armature windings 2 and 3 and the field windings 6 are illustrated on one side, since they form a single machine. In like manner are treated also the armature windings 1 and 4 and the field winding 5, which form the other machine.

It is clear that just as a certain number of machines with a single commutator can be replaced by half the number of double-commutator machines, so also can half the number of twin machines be arranged in place of the full number of single-commutator machines.

Figure 15:
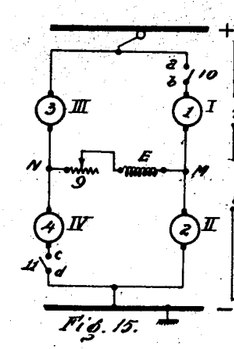

Hitherto, the normal operation of the machines operating according to the present invention has been considered. A method will now be briefly considered that renders possible an easy transition from the normal series operation to the shunt or compound operation of the machines, in the simplest possible form. The basis of this method is indicated in Fig. 15, for example, in connection with the already mentioned four-motor equipment. In Fig. 15, the four branches of the bridge are indicated respectively by the reference characters I, II, III and IV.

First of all, some of the machines are allowed to run as main-current motors, two suitable opposite branches (branches I and IV in Fig. 15) being open-circuited by opening the switches 10 and 11, while the other two branches are closed and connected to the mains, the excitation circuit of the machines being connected in series relation between them (in Fig. 15 the branches III and II and the circuit comprising the excitation circuit E and the series resistor 9). The voltages of the armature windings of the machines working idly in the two open branches (in Fig. 15 the armature windings 1 and 4) are next increased as compared with those of the armature windings which are carrying current (in Fig. 15 the armature windings 3 and 2) so that, when the bridge has been formed by closing the switches 10 and 11, the necessary disturbance of the symmetry of the bridge has been already effected, to thus obtain the operation of the machines as shunt or compound machines. The regulation of the voltage may be effected by means of any of the methods already discussed that serve for disturbing the symmetry of the bridge. When this variation of the voltages has taken place, the necessary regulation may be effected with the resistor 9 until there is no longer any difference in potential on opposite sides of the switches 10 and 11, that is, between the points $a$ and $b$, or $c$ and $d$. The switches 10 and 11 are then closed and transition takes place from series to shunt or compound operation of the machine without violent fluctuations of current.

These methods may be applied in the same way to any possible connection both with single-commutator and with double-commutator or twin machines.

Figure 8:
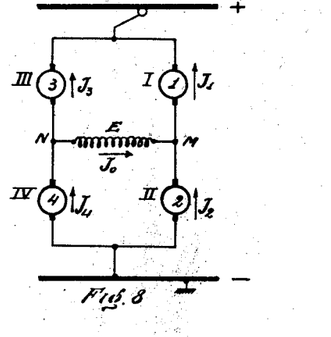
Fig. 8 illustrates the diagram simplified. E being any suitable excitation circuit.

If the four branches of the bridge, comprising either single machines or groups of machines, are adapted for the same strength of current, as is the case, for example, in Figs. 8, 10 and 11, then the machines will always be unequally loaded in shunt or compound operation under all conditions. This statement may be explained with the help of Fig. 8, for example. Suppose that the four machines are adapted for the same strength of current and the letters $J_1$, $J_2$, $J_3$, $J_4$ and $J_0$, respectively, indicate the currents in the four armature windings and in the common excitation circuit. If the machines are operating as generators supplying energy to the mains, the armature currents take the directions indicated. The excitation current $J_0$ flows in the direction of the corresponding arrow. Then $J_3 = J_4 - J_0$ and $J_2 = J_1 - J_0$, under all conditions; that is to say, the armature currents in two branches connected in series relation always vary by an amount corresponding to the excitation current; or, in other words, by the current flowing in the shunt circuit between M and N. In practice, it will be attempted, in general, to make $J_1 = J_4$ and $J_2 = J_3$. It will be seen, therefore, that the armature coils 1 and 4, when the machines are operated as generators, are always more heavily loaded by the amount of the excitation current than the armature windings 2 and 3. In the latter armatures, the current may assume a zero value or even a negative value, even when the equipment is acting regeneratively (in this case the two machines in question will then be running as motors), if the excitation current reaches a very high value. It is desirable, therefore, to equalize the loads of the machines by providing in the more heavily loaded branches I and IV machines that are adapted for greater current strengths, or several like machines connected in parallel relation like one another. The latter method, for example, has been utilized in the system of Fig. 9. In this case, the branches I and IV are each formed of two like machines connected in parallel relation, while the branches II and III comprise single machines.

In this case, which is given by way of example, a complete equalization of loads on the machines is obtained if the current flowing in the excitation circuit, or more correctly in the shunt circuit between the points M and N, is equal to a third of the current that is returned to the mains; that is to say, if the excitation current is equal to the true armature current of each machine.

As soon, however, as the current in the excitation circuit becomes lower than a third of the main current, the reverse action to what is shown in Fig. 8 in this connection occurs: the machines operating in the branches III and II are loaded more than the others.

Figure 16:
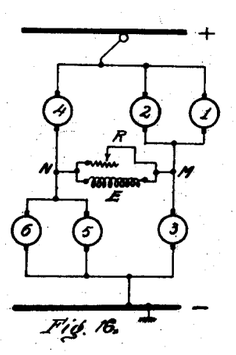
Fig. 16 illustrates the connections for a six-motor equipment provided with a resistance unit for equalizing the current.

Thus, in order to equalize the load of the machines, the current in the shunt circuit is increased and is made equal to a third of the main current. The excitation current must, of course, remain changed. The said equalization may be very easily effected by introducing a variable resistor, which may be provided with self induction, in shunt to the entire excitation circuit. An example is shown in Fig. 16, which illustrates the method of equalizing the load for the six-motor equipment shown in Fig. 9.

The letter R here indicates an adjustable resistor, which may be operated in any suitable manner—by hand, mechanically, electrically or automatically by a relay (e. g. a differential relay). This resistor is always set so that the current in the shunt excitation circuit is equal to a third of the main current. The above-mentioned equalization of the load of all machines will then be effected. In a corresponding manner, it is also possible to easily equalize the loads of the several machines in the many other possible arrangements.

Figure 17:
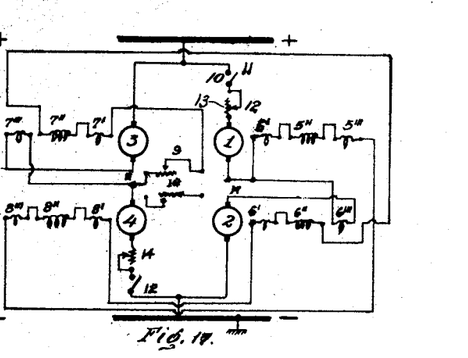
Fig. 17 illustrates the connections for all of the embodiments illustrated in Figs. 3, 4, 6, 7, 14, 15 and 16.

It is to be understood that practically all of the foregoing embodiments may be applied to a single system as shown diagrammatically in Fig. 17. The same reference characters are used as those used in the other figures except that 5″, 6″, 7″ and 8″ indicate the field windings and 5‴, 6‴, 7‴, and 8‴ indicate the adjustable exciting coils. 13 and 14 indicate two suitably proportioned and adjustable resistors and are in series relation with switches 11 and 12.

To sum up, the system forming the subject of the present invention affords the following advantages:

1. Simplicity, since it makes possible the recovery of energy exclusively by the use of the railway motors without any additional apparatus; it is, therefore, adapted to be used also on motor coaches.

2. A reasonable adaptation of the characteristic of the motor equipment to the requirements of the line.

3. Independence of the excitation current with respect to the direction of the main current.

4. The possibility of obtaining from a series-connected motor equipment a shunt-connected or group operation by simple means.

5. Stability of operation of the machines whether operating as motors or as generators.

6. Easy and gradual regulation of the several stages of speed.

7. A more reasonable utilization of the machines.

Having now particularly described and ascertained the nature of my said invention, and in what manner the same is to be performed, I declare that what I claim is:

1. In combination, feed lines; a plurality of dynamo electric machines having their armatures arranged in two sets, each set comprising a plurality of armatures connected in series and the two sets being connected to the feed lines in parallel; exciting coils for the armatures of said machines arranged in series and connected across the armature circuits at points where the potential drop in each set is substantially the same; and means whereby a difference in potential drop is caused to exist at the points of such connection of the exciting coils to the armatures.

2. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; and means comprising a variable resistance for causing a difference in potential drop to exist at the points of such connection of the exciting coils to the armatures and for permitting said difference to be varied.

3. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; other exciting coils arranged in series with the armatures; and means whereby a difference in potential drop is caused to exist at the points of such connection by the first-named exciting coils to the armature.

4. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; other exciting coils for said armatures, arranged in series therewith; and means comprising a variable resistance for causing a difference in potential drop to exist at the points of such connection of the first-named exciting coils to the armatures and for permitting said difference to be varied.

5. In combination, feed lines; a plurality of dynamo electric machines having their armatures arranged in two sets, the armatures in each set being connected in series and the two sets being connected to the feed lines in parallel; and exciting coils for the armatures of said machines arranged in series and connected across the armature circuits at points where the potential drop in each set is substantially the same, certain of said exciting coils being adapted to have portions cut out to cause a difference in potential drop to exist at the points of such connection of the exciting coils to the armatures.

6. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said exciting coils having portions adapted to be cut out to cause a difference in potential drop to exist at the points of such connection of the exciting coils to the armatures; and means comprising a variable resistance for further varying the difference in said potential drop.

7. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said coils having portions adapted to be cut out to cause a difference in potential drop to exist at points of such connection of the exciting coils to the armature; other exciting coils for the armatures arranged in series with the same; and means comprising a variable resistance in the circuit of said first-named exciting coils for further varying such difference in potential drop.

8. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; and means comprising a variable resistance arranged in shunt with certain of said exciting coils for causing a difference in potential drop to exist at the points of such connection of the exciting coils to the armatures and for permitting said difference to be varied.

9. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where a potential difference is caused to exist; and means comprising a variable resistance placed in series with certain of said exciting coils to vary the current therein.

10. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where a potential difference is caused to exist; a variable resistance placed in series with said exciting coils to control the current therein; and a variable resistance placed in shunt with certain of said exciting coils for controlling said potential difference.

11. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; other exciting coils for said armatures arranged in series with the same; and a variable resistance placed in shunt with the first-named exciting coils for causing a difference in potential drop to exist at the points of such connection of the exciting coils to the armatures.

12. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said exciting coils being adapted to have portions cut out to cause a difference in potential drop to exist at the points of such connection of the exciting coils to the armatures; and means comprising a variable resistance placed in series with said exciting coils to control the current therein.

13. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said exciting coils being adapted to have portions cut out to cause a difference in potential drop to exist at the points of such connection of the exciting coils to the armatures; and means comprising a variable resistance placed in shunt with certain of said exciting coils for further varying said difference in potential drop.

14. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said exciting coils being adapted to have portions cut out to cause a difference in potential drop to exist at the points of such connection of the exciting coils to the armatures; and a variable resistance placed in series with said exciting coils and a variable resistance placed in shunt with certain of said coils for further varying the difference in potential drop.

15. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; and means comprising variable resistances placed between the feeding lines and the armatures for causing a difference in potential drop to exist at the points of such connection with exciting coils to the armatures.

16. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where a potential difference is caused to exist; and a variable resistance placed in series with the exciting coils to control the current therein; and variable resistances placed between the armatures and the feed lines for controlling said potential difference at the points of such connection of the exciting coils to the armatures.

17. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same; and a variable resistance placed in series with said exciting coils and another variable resistance placed in shunt with certain of said coils for causing a difference in potential drop to exist at the points of such connection of the exciting coils to the armatures and for varying said difference; and variable resistances placed between the armatures and the feed lines for further varying said difference in potential drop.

18. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said coils being adapted to have portions cut out to cause a difference in potential drop to exist at the points of such connection of the coils to the armatures; and a variable resistance placed between the armatures and the feed lines for further varying said difference in potential drop.

19. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said coils being adapted to have portions cut out to cause a difference in potential drop to exist at the points of such connection of the exciting coils to the armatures; a variable resistance placed between the armatures and the feed lines for further varying said difference in potential drop; and a variable resistance placed in series with the exciting coils and a variable resistance placed in shunt with certain of said exciting coils for further varying the difference in potential drop.

20. In combination, feed lines; a plurality of dynamo electric machines having their armatures arranged in two sets, the armatures in each set being connected in series and the two sets being connected to the feed lines in parallel; exciting coils for the armatures of said machines arranged in series and connected across the armature circuits at points where the potential drop in each set is substantially the same, certain of said coils being adapted to have portions cut out to cause a difference in potential drop to exist at the points of such connection of the exciting coils to the armatures, a variable resistance placed between the armatures and the feed lines for further varying said difference in potential drop; a variable resistance placed in series with the exciting coils and a variable resistance placed in shunt with certain of said coils for further varying the difference in potential drop; and auxiliary exciting coils placed in series with the armatures.

21. In combination, feed lines; a pair of sets of dynamo electric machine armatures each set connected together and to the feed lines to constitute sides of a Wheatstone bridge; and exciting coils for said armatures connected together and to the opposite sides of the Wheatstone bridge to form the bridge of the same and deriving current from said sides by reason of an unbalanced condition existing in the Wheatstone bridge.

22. In combination, feed lines; a plurality of dynamo electric machines having their armatures arranged in two sets, each set comprising a plurality of armatures connected in series and the two sets being connected to the feed lines in parallel; and exciting coils for the armatures of said machines arranged in series and connected across the armature circuits at points where a potential difference is caused to exist.

23. In an electric system, a plurality of sets of translating devices, the devices in each set arranged in series, the sets being connected in parallel; exciting coils for said translation devices connected across a circuit of the translating devices; and means whereby a difference in potential is caused to exist at the points of such connection, in order that current may flow through the exciting coils.

24. In combination, feed lines; a plurality of dynamo electric machines having their armatures connected together in a circuit so as to form the four branches of a Wheatstone bridge, said circuit being connected to the feed line; a plurality of exciting coils for said armatures connected across the armature circuit at a point where a galvanometer is connected in a Wheatstone bridge; and means whereby a potential difference is caused to exist at the points of such connection of the exciting circuit to the four branches by unbalancing the otherwise symmetrical distribution of the tension in the branches of the bridge, said means including means for varying the total current flowing across said points without varying said potential difference, and means for opening two symmetrical opposite branches of the bridge for allowing in the first place certain machines to run as series machines.

25. In combination, feed lines; a plurality of dynamo electric machines having their armatures connected together in a circuit so as to form the four branches of a Wheatstone bridge, said circuit being connected to the feed line; a plurality of exciting coils for said armatures connected across the armature circuit at a point where a galvanometer is connected in a Wheatstone bridge; and means whereby a potential difference is caused to exist at the points of such connection of the exciting circuit to the four branches by unbalancing the otherwise symmetrical distribution of the tension in the branches of the bridge, said means including means for varying said potential difference, means for varying the total current flowing across said points without varying said potential difference, and means for opening two symmetrical opposite branches of the bridge for allowing in the first place certain machines to run as series machines.

26. A system of control comprising a plurality of armatures connected in the respective arms of a four-sided circuit; power connections disposed at opposite junction-points of said arms; and an excitation circuit for said armatures connected between the remaining junction-points of said arms.

27. A system of control comprising a plurality of dynamo-electric machine elements connected in the respective sides of a Wheatstone bridge loop; means for connecting the co-operating elements of the machines between opposite junction-points of said sides; power connections disposed at the remaining junction-points of said arms and normally tending to produce substantially equal voltages at the first-named junction-points; and means associated with certain of said machine elements for overcoming such normal tendency and causing current to flow between the first-named junction-points.

28. A system of control comprising a plurality of translating devices arranged in a closed circuit provided with a junction-point between each adjacent pair of devices; a source of energy connected to two of said junction-points; and means connected between two other junction-points for effecting a variation of the potential drop therebetween.

29. A system of control comprising a plurality of armatures arranged in a closed circuit provided with a terminal-point on opposite sides of each armature, field windings for said armatures connected between two of said terminal-points, the remaining terminal-points serving as power terminals for the system, and means for dissimilarly exciting certain of said field windings.

30. The method of effecting regenerative operation to a power circuit, of a plurality of momentum-driven armatures disposed in a closed circuit and provided with a plurality of exciting field windings connected to points intermediate certain pairs of said armatures, other similar points being connected to said power circuit, which consists in effecting a flow of current through said field windings.

31. The method of effecting regenerative operation to a power circuit of a plurality of momentum-driven armatures disposed in the respective arms of a four-sided circuit and provided with a plurality of exciting field windings connected to opposite junction-points of said arms, the remaining junction-points of said arms being connected to said power circuit, which consists in producing a difference of potential across the terminals of the field-winding circuit.

32. In an electric system, a plurality of translating devices connected in the respective arms of a four-sided circuit and provided with a terminal point between each adjacent pair of devices; supply conductors connected to two of said terminal points; a second set of translating devices connected between the remaining terminal points; and means for effecting a drop in potential between the last-named terminal points.

In testimony whereof I affix my signature.

EMILIO SANTUARI.